Figure 1:
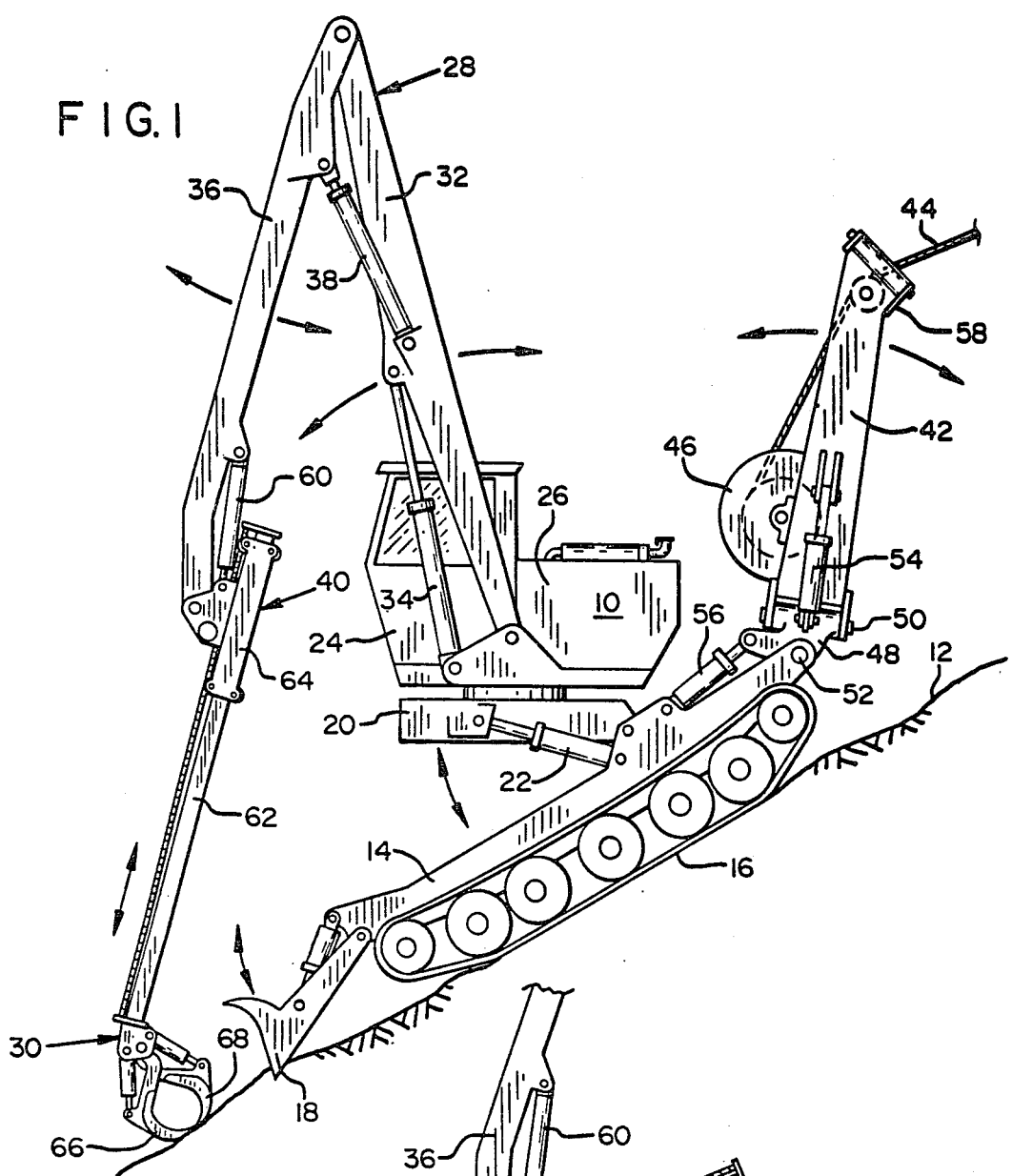

United States Patent [19]

Schenck et al.

[11] 4,353,424
[45] Oct. 12, 1982

[54] SLASH GATHERING VEHICLE

[76] Inventors: Ray B. Schenck, Box 94, Grays River, Wash. 98621; Wilhelm Schmidt, 47502 288th Ave. SE., Enumclaw, Wash. 98022

[21] Appl. No.: 153,412

[22] Filed: May 27, 1980

[51] Int. Cl.³ ............................................. A01B 49/04
[52] U.S. Cl. .................................. 172/438; 414/694; 414/739; 414/718; 280/491 F; 172/247; 172/665
[58] Field of Search ............... 414/729, 733, 734, 738, 414/739, 743, 718, 715, 687, 688, 690, 745, 694; 294/86 R, 88; 280/491 F, 480; 172/197, 198, 247, 438, 665, 685, 694, 697, 738, 766

[56] References Cited

U.S. PATENT DOCUMENTS

| 3,627,156 | 12/1971 | Billings | 414/690 X |
| 3,631,995 | 1/1972 | Jones | 414/739 X |
| 4,030,776 | 6/1977 | Bricknell | 280/491 F |
| 4,178,030 | 12/1979 | Dolinsek | 294/88 X |
| 4,248,471 | 2/1981 | La Bounty | 294/88 |

FOREIGN PATENT DOCUMENTS

| 190522 | 6/1964 | Sweden | 414/718 |
| 391056 | 7/1973 | U.S.S.R. | 414/734 |
| 502625 | 4/1976 | U.S.S.R. | 414/734 |

*Primary Examiner*—John J. Love
*Assistant Examiner*—Terrance L. Siemens
*Attorney, Agent, or Firm*—Klarquist, Sparkman, Campbell, Leigh, Whinston & Dellett

[57] ABSTRACT

A vehicle for removing slash from steep logging slopes includes an anti-skid propulsion system characterized by a power winch for reeling in an uphill-anchored cable and a pair of crawler tracks driven in synchronization with the winch. The vehicle has an articulating tail boom for working against the cable to assist in maneuvering the vehicle along the slope and stabilizing the vehicle during slash gathering operations. A knuckle boom which is extendable from the vehicle for gathering slash within a relatively large area around the vehicle and preparing the soil for planting. A slide mechanism is disposed at the end of the knuckle boom for selectively varying the overall length of the boom. The slide mechanism includes a pair of claws which can be operated as a grapple for gathering slash or as a rake for scarifying the forest soil. The slide mechanism can be tilted for optimum orientation of the claws during raking.

5 Claims, 2 Drawing Figures

SLASH GATHERING VEHICLE

The present invention pertains to vehicles and methods for gathering and removing slash from a logging slope.

Heretofore it has been common practice in the art to burn slash after a logging operation particularly on steep, rugged logging slopes from which slash removal is more difficult and consequently more expensive. The rising cost of energy in recent years has made slash recovery economically attractive under appropriate conditions. It has just recently become common practice on gentle accessible slopes to gather and use logging slash for composition board, pulp and paper, and energy. It is becoming increasingly profitable to use slash as firewood or in other energy related applications. The present invention permits more efficient removal of slash so that even rugged, steep logging slopes can be exploited economically.

It will be appreciated that it is desirable to achieve reforestation in the shortest possible time. Such an objective demands that any slash removal operation be performed with a minimum of disruption to the forest soil. Prior art practices have often lead to serious soil erosion so as to unnecessarily add decades to the reforestation cycle. The present invention enables slash removal with a minimum of damage to the forest mantle and assists in preparing the site for reforestation.

In accordance with the present invention, a slash gathering vehicle is movable up and down a steep logging slope and includes an extendable knuckle boom capable of clearing a large circular area of a logging slope surrounding the vehicle at an operating site on the slope. A combined grapple and raking mechanism which is provided on the end of the knuckle boom can be manipulated for proper orientation relative to the contour and varied conditions of the slope.

Figure 2:
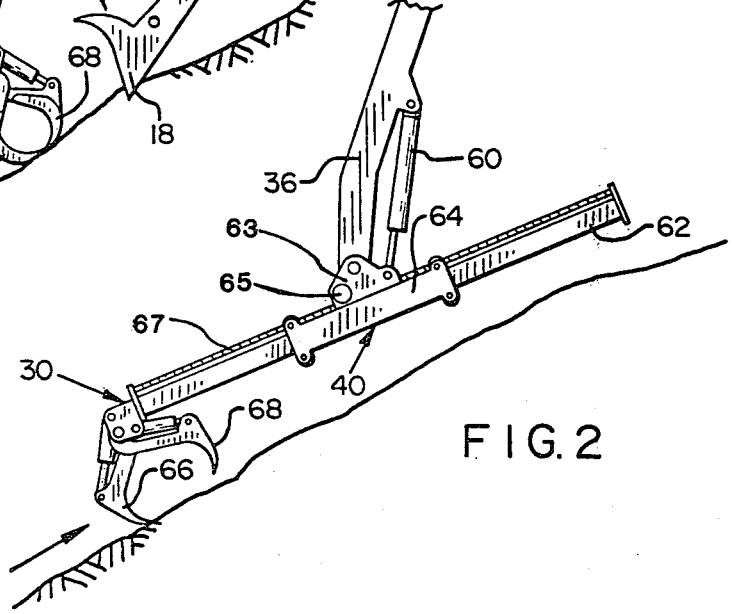

A preferred way of practicing the invention will now be described with reference to the accompanying drawing, in which:

FIG. 1 is a side elevational view of a slash gathering vehicle in accordance with the present invention; and FIG. 2 is a side elevational view of a rake and grapple portion of the vehicle in FIG. 1 shown in a different position.

FIG. 1 illustrates a vehicle 10 for gathering slash from a steep logging slope 12. The vehicle 10 is motivated in a crawler-type lower chassis 14 having a low ground pressure track 16 on each side and a conventional front dozer blade 18. Each of the two side tracks 16 (only the left track being visible) is powered independently by conventional hydrostatic drive means. The lower chassis 14 carries an upper chassis 20 which is equipped with a leveling system including hydraulic cylinders 22 for maintaining an operator's cabin 24 in a horizontal or other suitable attitude. A prime mover housing 26 is disposed on the upper chassis 20 rearward from the operator's cabin 24 and is equipped with a diesel engine and hydraulic pumps for controllably powering the vehicle's various systems. A knuckle boom 28, which is mounted on the upper chassis 20 adjacent to the cabin 24, has a hydraulically actuated grapple 30 at its remote end. The knuckle boom 28 comprises an upper arm 32 pivotally secured to the chassis 20 and actuated by a hydraulic cylinder 34, a forearm 36 pivotally secured to the remote end of the upper arm 32 and actuated by a hydraulic cylinder 38, and a rack-and-pinion driven slide mechanism 40 carried by the remote end of the forearm 36. The portion of the vehicle 10 upon which the knuckle boom 28 is mounted which includes the cabin 24 and housing 26 is pivotable on the chassis 20 through 360° so that the knuckle boom 28 can be used to clear a large circular area around the vehicle, as will be described more fully below.

A tail boom 42 is mounted on the rearward end of the lower chassis 14 for working a propulsion or anchor cable 44 which is secured uphill to a suitable support such as a tree stump (not shown). The tail boom 42 carries a hydrostatically powered winch 46 for reeling in or letting out the cable 44 under the control of the operator in the cabin 24. Interconnecting the tail boom 42 and the chassis 14 is a universal joint 48 providing first and second pivotal axes 50 and 52 for lateral and longitudinal articulation of the tail boom 42 under the control of push-pull hydraulic cylinders 54 and 56. A fairlead 58 having crossed cylindrical rollers is provided on the remote end of the tail boom 42 for guiding the cable 44 onto the winch 46. When the knuckle boom 28 is extended to reach to one side, the tail boom 42 can be used to stabilize the vehicle 10 by interaction with the cable 44 while under tension. With the tail boom 42 in a near vertical position, the vehicle 10 can safely move laterally across the slope motivated by the tracks 16 and stabilized by the tension on the cable 44.

In an alternative arrangement contemplated by the invention, the propulsion winch 46 can be eliminated from the vehicle 10 and provided instead on an apparatus (not shown) located at an uphill point, in which case the cable 44 would be secured to a point on the base of the tail boom 42. As a further alternative, an additional winch (not shown) can be provided at an uphill point for selectively operating independently of or in tandem with the vehicle-mounted winch 46.

Referring to FIG. 2, the slide mechanism 40 is shown in a raking position oriented at an optimum angle relative to the ground contour for the particular grade and raking direction. The angle between the forearm 36 and the slide mechanism 40 can be varied during operation by means of a tilt cylinder 60. The slide mechanism 40 comprises an elongated bar 62 slidably disposed in a casing 64 having a connecting member 63 which is pivotally supported at the remote end of the forearm 36. The bar 62 can be selectively positioned under the control of a motor 65 mounted on the connecting member 63 for driving a conventional pinion gear (not shown) which engages a rack 67 disposed along the bar 62 in the manner depicted.

In addition to operating as a conventional grapple, the slide mechanism and grapple arrangement is capable of performing additional operations. For example, when oriented in the position shown in FIG. 2, a front claw 66 of the grapple 30 can be used effectively as a scarifying rake. During raking, a rear claw 68 serves to guide and control the depth of penetration of the front claw 66 into the soil. Those skilled in the art will appreciate that hydraulic lines (not shown) for operating the cylinders that work the claws 66 and 68 can be provided in a manner which does not interfere with the sliding action of the bar 62 relative to the casing 64, such as by means of a conventional "lazy tong" or a suitable reel-out system. The versatility of the assembly of the slide mechanism 40 and grapple 30 enables preparation of the forest soil for planting immediately after slash removal at each operating site on the slope 12 before moving the vehicle 10 to a new site.

In operation, the vehicle 10 moves down the slope 12 to the bottom and then works its way back up in stages. The dozer blade 18 is used to anchor the vehicle 10 in setting up at each stage, thereby also forming a "water bar" in the slope 12 as a consequence of setting up. The knuckle boom 28 is preferably capable of reaching 50 feet to each side and is used to gather slash and then rake the slope transversely to the fall line in order to create "erosion barriers" across the slope. It will be appreciated, therefore, that the vehicle 10 is capable of removing slash from a hundred foot wide swath while also preparing the slope 12 for reforestation in progessive setups while working its way back up the slope. The vehicle 10 is also capable of bulldozing corridors through young forests that have not been previously logged.

In accordance with an important feature of the invention, the slide mechanism 40 can be gradually tilted during raking so that the claws 66 and 68 can be maintained at an optimum raking angle relative to the ground contour. In other words, as the boom 28 is drawn toward the vehicle 10 with the claw 66 raking the soil as shown in FIG. 2, the tilt cylinder 60 extends its ram at a rate which compensates for the rate of increase in the angle of elevation of the forearm 36 so that the angle of elevation of the bar 62 is maintained generally constant.

In accordance with another important feature of the invention, the tracks 16 are underpowered and are synchronized with the winch 46 which provides the primary propulsion, so that the tracks 16 merely assist movement and steer the vehicle 10. Speed and pressure compensated pumps in the hydrostatic drive systems of the tracks 16 can be used to provide the desired synchronization, thereby minimizing spinout and slippage of the tracks and the consequent soil disturbance. Because the tracks 16 only assist the propulsion winch 46, far less horsepower is required to drive the tracks than would otherwise be provided.

From the foregoing description, it will be appreciated that the invention enables slash gathering and removal from steep logging slopes with minimum damage to the forest mantle and permits the slope to be prepared for immediate planting as part of the slash removal operation.

Although a preferred embodiment of the invention has been described in detail, it is to be understood that various changes, substitutions and alterations can be made therein without departing from the spirit and scope of the invention as defined in the appended claims.

What is claimed is:

1. A slash gathering vehicle comprising:
   a chassis;
   traction means supporting the chassis for movement along a steep logging slope;
   an elongated boom having an upper arm pivotally carried by the chassis and a forearm pivotally secured to the remote end of the upper arm;
   a slide mechanism disposed at the remote end of the forearm, the slide mechanism being selectively extendable to increase or decrease the length of the boom; and
   an articulating tail boom for stabilizing the vehicle by applying a lateral force to a cable under tension anchored to an uphill point on the slope to enable the boom to reach to one side with the slide mechanism at full extension for gathering slash without overturning the vehicle.

2. The vehicle of claim 1 further comprising a winch for reeling in the cable to motivate the vehicle uphill with assistance from the traction means which are driven in a manner which substantially eliminates skidding.

3. The vehicle of claim 1 in which the slide mechanism includes claw means at its remote end, the claw means being adjustable to one position for gathering slash and to another position for raking the soil of the slope.

4. The vehicle of claim 3 further comprising means for tilting the slide mechanism to orient the claw means in a raking position, the tilting means being actuable to progressively increase the angle between the slide mechanism and the forearm to maintain the slide mechanism at an optimum angle of elevation during raking.

5. The vehicle of claim 3 wherein the claw means includes front and rear claws interconnected as a grapple, the claws being separately controllable so that the front claw can be dragged through the soil of the logging slope while the rear claw serves to guide and control the depth of penetration of the front claw into the soil.

* * * * *